(12) United States Patent
Swartz et al.

(10) Patent No.: US 6,346,210 B1
(45) Date of Patent: *Feb. 12, 2002

(54) METHOD OF SHAPING SUSCEPTOR-BASED POLYMERIC MATERIALS

(75) Inventors: Henry D. Swartz, Chestnut Hill; Gary P. Magnant, Rockport; George Corey, Newton, all of MA (US)

(73) Assignee: The Rockport Company, LLC, Canton, MA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/023,740

(22) Filed: Feb. 13, 1998

Related U.S. Application Data

(60) Provisional application No. 60/038,189, filed on Feb. 14, 1997.

(51) Int. Cl.$^7$ .......................... B29C 35/08; B29C 35/12
(52) U.S. Cl. .................. 264/486; 264/320; 264/321; 264/413; 264/487; 264/489; 264/490; 264/496
(58) Field of Search .................. 264/413, 293, 264/321, 486, 487, 489, 490, 496, 320

(56) References Cited

U.S. PATENT DOCUMENTS

| | | | |
|---|---|---|---|
| 2,206,029 A | 7/1940 | Daniels | 36/71 |
| 3,391,595 A | 7/1968 | Iwai | 87/7 |
| 3,641,688 A | 2/1972 | von den Benken | 36/43 |
| 3,895,405 A | 7/1975 | Edwards | 12/146 |
| 3,902,940 A * | 9/1975 | Heller, Jr. et al. | 156/79 |
| 4,219,361 A | 8/1980 | Sutton et al. | 106/63 |
| 4,237,626 A | 12/1980 | Brown | 36/43 |
| 4,272,898 A | 6/1981 | Tansill | 36/44 |
| 4,413,429 A | 11/1983 | Power | 36/44 |
| 4,433,494 A | 2/1984 | CourvoisIer et al. | 36/119 |
| 4,669,142 A | 6/1987 | Meyer | |
| 4,728,566 A | 3/1988 | Lancaster et al. | 428/286 |
| 4,955,909 A * | 9/1990 | Ersek et al. | 623/11 |
| 4,962,593 A | 10/1990 | Brown | 36/43 |
| 4,969,968 A | 11/1990 | Leatherman | 156/272.4 |
| 5,021,293 A | 6/1991 | Huang et al. | 428/328 |
| 5,035,713 A * | 7/1991 | Friis | 623/16 |
| 5,089,556 A | 2/1992 | Tabor et al. | 525/64 |
| 5,095,570 A | 3/1992 | Bar et al. | 12/142 |
| 5,123,180 A | 6/1992 | Nanning et al. | |
| 5,254,197 A | 10/1993 | Klems | 156/272.2 |
| 5,294,763 A | 3/1994 | Chamberlain et al. | 219/729 |

(List continued on next page.)

OTHER PUBLICATIONS

Collier, J., "A Moist, Odour–Free Environment: A Multi-centred Trial of a Foamed Gel and a Hydrocolloid Dressing," *Professional Nurse* 804, 806 and 808 (Sep. 1992).

Mennen, U., "A Simple, Comfortable, Conforming, and Adaptable Splint," *14 The Journal of Hand Surgery* 576–78 (May 1989).

Fish, F.S., et al., "Aquaplast Thermoplastic (Opti–Mold)," *20 J. Dermatol. Surg. Oncol.* 239–44 (Apr. 1994).

Steinberg, G., et al., "Dry Gangrene of Toes: Managed with Foam Rubber Boots and Ambulation," 76 N.Y. State J. Med. 907–11 (Jun. 1976).

Schmidtmadel, W., "The Treatment of Decubitus Ulcers with Polyester Foam–Rubber," *12 Germ. Med. Mon.* 539–40 (Nov. 1967).

*Primary Examiner*—Allan R. Kuhns
(74) *Attorney, Agent, or Firm*—Sterne, Kessler. Goldstein & Fox P.L.L.C.

(57) ABSTRACT

A susceptor-impregnated thermoplastic foam is molded by heating the susceptor-impregnated thermoplastic foam, preferably by induction; imprinting an object against the foam; and allowing the foam to cool into a hardened form conformed to the object.

26 Claims, 14 Drawing Sheets

U.S. PATENT DOCUMENTS

| | | | | |
|---|---|---|---|---|
| 5,326,354 A | * | 7/1994 | Kwarteng | 264/293 |
| 5,555,584 A | | 9/1996 | Moore et al. | 12/142 |
| 5,658,330 A | * | 8/1997 | Carlisle et al. | 623/11 |
| 5,667,621 A | * | 9/1997 | Dougherty et al. | 156/275.7 |
| 5,698,306 A | * | 12/1997 | Prosise et al. | 264/45.1 |
| 5,733,647 A | | 3/1998 | Moore et al. | 428/304.4 |
| 5,762,854 A | * | 6/1998 | Valyi | 264/323 |
| 5,829,171 A | | 11/1998 | Weber et al. | |
| 5,855,818 A | | 1/1999 | Gan et al. | |

* cited by examiner

METHOD OF SHAPING SUSCEPTOR-BASED POLYMERIC MATERIALS

RELATED APPLICATIONS

This application claims the benefit of U.S. Provisional Application No. 60/038,189 filed on Feb. 14, 1997, the contents of which are incorporated herein by reference in their entirety.

BACKGROUND

Conductive foams are currently manufactured for purposes other than induction heating. These foams are currently used in conductive grounding and static electrical dissipation applications, principally used in electronic or microchip fabrication facilities. Conductive foams direct static charge away from precious electro-sensitive parts. Static-dissipative packaging foam insulates, structurally protects and electrically protects sensitive electronic parts. These markets are limited in size and thus current production of static and electrically dissipative foam is limited. The foams are expensive because of limited demand. New markets that increase the demand for such foams will drive compounding costs down as the cost of susceptor material is negligible.

The production of thermoplastic closed-cell foam sheet and laminates and their industrial conversion into manufactured parts such as insoles and cushioning are time consuming processes. The rate limiting steps are 1) the time required to initially produce the foam, 2) the time required to heat the foam and 3) the cure time in the mold. A typical industrial foam conversion system involves standard ovens or infrared (IR) preheating of sheet foam to approach melting temperature. Although IR has improved speed of heating, it still takes 3060 seconds to uniformly heat most ¼" thick thermoplastic foams. The principal problem of heating foams using standard technology is due to the structural insulative capacity of foam. Such-heating systems require that the air trapped within the foam be heated as well as the base polymer. Thus, the heated foam absorbs and retains higher levels of heat to approach melting temperatures. Cooling thoroughly-heated, converted foams takes significant time also due to the insulative properties of the foam. A typical press used for insole technology will take 30–120 seconds to cool the foam depending on thickness. Such heating and cooling times do not lend themselves to automation, thus virtually all insoles manufactured in the world are manufactured using semi-automated or manual processes.

SUMMARY OF THE INVENTION

The invention resolves the above stated problems by provision of a material that is inherently susceptible (will soften by heating from the inside out via magnetic induction) or has susceptible inclusions as layers or particles intermixed with a non-susceptible matrix for similar heat softening via magnetic induction The magnetic induction can be provided via microwave, electromagnetic coils and other known induction forms.

The material, when softened, is sufficiently malleable to conform to a molding impression provided by a human body part (e.g., hand, knee, foot) or other complex curvature object and to take a permanent set conforming to such curvature as the material cools.

The material has sufficient thermal insulation characteristic to be heat softened internally and substantially cooler to the touch on the outside to enable many of the uses described below.

Another aspect of the invention includes the use of susceptor particles, mixed with resin, to accelerate polymerization of the resin by inductively heating the susceptor particles. Further, susceptor particles may also be incorporated in resins during polymeric molding operations. As the polymer is being cast, the susceptor particles are inductively heated to drive polymerization without need to heat the mold.

BRIEF DESCRIPTION OF DRAWINGS

The foregoing and other objects, features and advantages of the invention will be apparent from the following, more particular description of preferred embodiments of the invention, as illustrated in the accompanying figures. The drawings are not necessarily to scale, emphasis instead being placed upon illustrating the principles of the invention.

DETAILED DESCRIPTION

Figure 1:
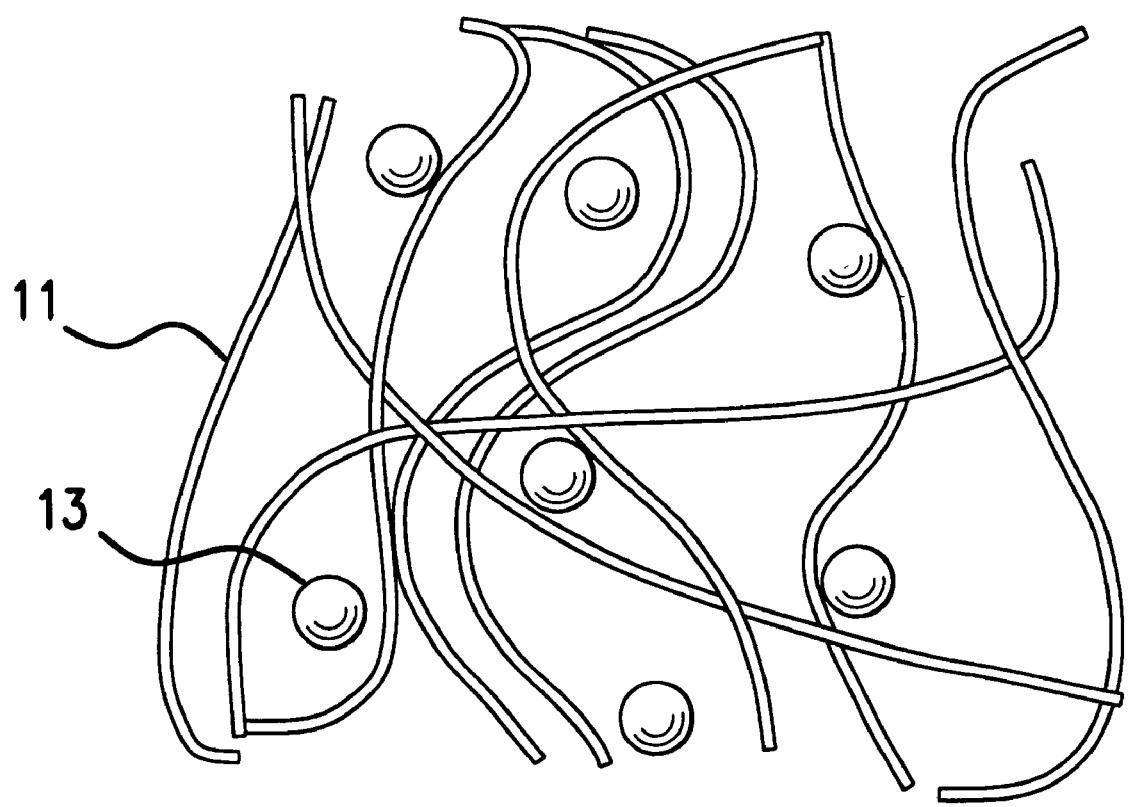
FIG. 1 conceptually illustrates a magnified representation of the solid region of a susceptor-impregnated foam.

The features and other details of the method of the invention will now be more particularly described with reference to the accompanying drawings and pointed out in the claims. Numbers that appear in more than one figure represent the same item. It will be understood that the particular embodiments of the invention are shown by way of illustration and not as limitations of the invention. The principle features of this invention can be employed in various embodiments without departing from the scope of the invention.

For purposes of this disclosure, "polymer" means (i) any polymer which is in part inherently a susceptor material itself, (ii) any polymer which is at least in part a thermo-reformable polymer in which a susceptor is embedded or any bead-like or layered polymer which is partly composed of either an inherently susceptor polymer or a thermo-remoldable polymer in which a susceptor is embedded, (iii) any thermo-reformable polymer which can be heated by another material (e.g., metal film, piezoelectric film, water, etc.) or (iv) any formulation of a gel or solution which is capable of being converted into a flexible, semi rigid or rigid polymer upon heating or promoted by heating. The polymer (or gel), itself, or as a composite, alloy or co-polymer, must be capable of being molded, formed, molded or cured once heated. The polymer may come in many forms including but not limited to a foam, gel, colloid, solid phase, and a composite of beads of solid or foamed polymer, some or all of which have susceptor qualities or susceptor-like devices used therein. Gels may include but are not limited to formulations of elastomeric acrylic, urethane or alginate compositions, where certain reagents may be encapsulated prior to exposure to any source of energy. Solid or foamed polymer sheets may be modified, as well, by punching aerating holes of various dimensions therein or otherwise creating shifts in the density of material or the susceptor itself (e.g., gradient changes in susceptor-embedded foams).

"Inductive heating," for purposes of this disclosure, includes heating by electromagnetic induction and magnetic induction. Suitable sources of inductive heating include microwave ovens, radio-frequency transmitters and electromagnetic coils.

For purposes of this disclosure, "resins" include solids and liquids which can be polymerized. For example, suitable resins include prepolymers as well as other forms of monomers and oligomers.

"Susceptor," for purposes of this disclosure, means any compound or material capable of converting microwaves, radio frequency transmission, or magnetic induction into heat.

"Laminates," for purposes of this disclosure, can be made of susceptor-based foams and a plurality of other materials including: standard foams, antimicrobic impregnated or coated materials, activated carbon impregnated or coated materials for odor control, hydrocolloid gels, desiccants, flocked materials, cork, fibrous mats, felts, woven and nonwoven textiles, leather, elastomeric hotmelt foams, elastomeric foams, sintered foams, reticulated foams, open or closed cell foams, thermoset or thermoplastic elastomeric rubbers and foams, syntactic foams, and a plurality of other materials which are not susceptor-based. Susceptor-based portions of such laminates are conformable through inductive heating processes and lend conformability to the laminate. "Other materials" or "materials" which, for purposes of this disclosure, can be used in conjunction with any of the above to make laminates, structures, objects and devices described or set forth below include but are not limited to adhesives; fabric cover; electrically heatable/resistive printed circuit film; thermally shrinkable polymer films; piezoelectric films; nonwoven fabric; leather; conductive silicone; hot melt adhesives or waxes; shock absorbing gel core for insoles; heat shrink felt, odor control materials like carbon perfume and/or antimicrobic and/or sodium, bicarbonate, antiseptic agents, moleskin, canvas, Keel, glass or ceramic micro spheres, vapor barrier polymer films, stretchable mesh or fabrics, plastic films, and coloring agents.

Thermo-malleable polymers may inherently be susceptor, or polymers may be embedded with susceptor, including but not limited to carbon particles, metal particles, metal compounds like boron carbide, zinc oxide and the like. These polymers can be formed into sheets, foam sheets, granules or beads or other shapes that can be manufactured by conventional means.

A susceptor-impregnated foam of this invention is conceptualized in FIG. 1. Specifically, FIG. 1 provides a magnified illustration of a solid region of the foam. Within this solid region, a bed of polymers 11 is infused with susceptor particles 13. The polymers 11 are preferably either ethylene-vinyl acetate (EVA) or rubberized EVA. Cross-linked polyethylene may also be used. The susceptor particles 13 are preferably refractory. Examples of suitable susceptor particles 13 include metals and metal oxides, such as tin oxide. In this embodiment, the amount of susceptor material 13 is sufficiently limited to prevent the formation of an interlinked chain of susceptor particles 13. Rather, the majority of susceptor particles 13 in the polymer 11 do not contact any other susceptor particles 13. In foams having more than 10% susceptor material, heating of the susceptor 13 may produce arcing due to contact between susceptor particles 13. This arcing will often produce rapid overheating in many of the processes which are described below and is therefore undesirable. Nevertheless, higher susceptor concentrations can often be accommodated by adjusting the parameters of the heating process.

The foam is formed either (a) through a standard "foaming" reaction during polymerization where the pores are formed by released gases or (b) through the inclusion of hollow glass micro spheres mixed in with the polymer. Where glass micro spheres are used, pores are produced at the site of each micro sphere within the polymer matrix.

In accordance with one aspect of this invention, the susceptor-based foam is formed by mixing susceptor particles with liquid prepolymers and allowing the prepolymers to polymerize. The unique properties of the susceptor materials can be advantageously utilized to speed the polymerization reaction through magnetic induction of the susceptor. The magnetic induction energy produces heat in the susceptor particles, and this heat is conducted into the surrounding polymer. The heat added by the susceptor particles speeds the rate of polymerization. Accordingly, the presence of the susceptor provides an easy and efficient mode of supplying heat to the polymerization reaction. This process of susceptor-accelerated polymerization can be readily adopted to accelerate preexisting methods of processing susceptor-based foams.

Further, in accordance with another aspect of this invention, susceptor materials are impregnated into prepolymer mixtures solely for the purpose of enhancing the polymerization and foaming process. In a typical plastic or foam molding process, prepolymer is poured into a mold, and the mold is heated. Heat is conducted from the mold into the prepolymer, driving polymerization of the prepolymer. Following polymerization, the cast polymer object cannot be released until the mold has cooled. By incorporating susceptor in the prepolymer mixture, heat can be supplied inductively and the mold need not be heated at all. As a result, the time and energy required to heat and cool the mold is eliminated, and the mold, itself, can be formed of plastic or other inexpensive material as the mold does not require the refractory qualities that were needed where heating required conductive thermal transport through the mold.

Once a susceptor-impregnated foam sheet, for instance, has been made using either standard methods or the above-described methods, it can be converted into confirmation parts much more rapidly than currently-used technologies. In a conventional technique for heating foam, infrared radiation is directed at the foam. The infrared energy heats air pockets defined by the pores within the foam. This heat is then transferred from the air pockets to the surrounding foam. The use of infrared heating techniques typically requires at least 30 seconds to heat a ⅛-inch-thick foam sheet.

In contrast, the application of magnetic induction, radio frequency or microwave energy will heat a ⅛-inch-thick susceptor-based foam sheet in only 3 to 5 seconds. When magnetic induction, radio frequency or microwave energy is applied to such foams, heat is directly transferred from the susceptor to the surrounding polymer without the necessity to concurrently heat insulating air pockets trapped in the foam. Accordingly, uniform melting temperatures can be achieved in fractions of a second using industrial induction systems. As the overall heat imparted into the susceptor-based foam is much less than standard heating technologies, the time to concurrently cool the foams below the melting point is significantly less. Foams can be heated to within a few degrees of melting temperature allowing for rapid cooling. In addition, air pockets within the foam can be chilled through refrigeration or cold gas treatment just prior to inductive heating. As only the polymer is heated, the air pockets serve as cooling reservoirs to wick off heat generated by the induced polymer. Therefore, cooling can be nearly instantaneous. Accordingly, the surface of a susceptor-based foam can be handled much more quickly after heating, compared to foams heated with infrared radiation. With the rate limiting step of heating foams eliminated and concurrent cooling times minimized, the conversion of thermoplastic foams can now be easily automated. Even without commitment to automated processes, this form of heating substantially improves the output of current foam conversion facilities.

Susceptor-based foams can also be remanufactured through multiple induction-heating steps with ease. An inductor-based insole can be manufactured in the factory using automated technology. This generic insole can then be reheated using microwave induction in the home, inserted into the shoe and stepped on. The insole reconforms to the shape of the sole of the foot and inner dimension of the shoe, resulting in significant equilibration of pressure and greater comfort. Such insoles heat within seconds and retain significantly less heat than oven-heated insole systems. Accordingly, there is less heat exposed to the foot. Once conformed, the insole retains the new shape. Thus, a better than old-shoe fit is combined with the resiliency of a new insole.

Figure 2:
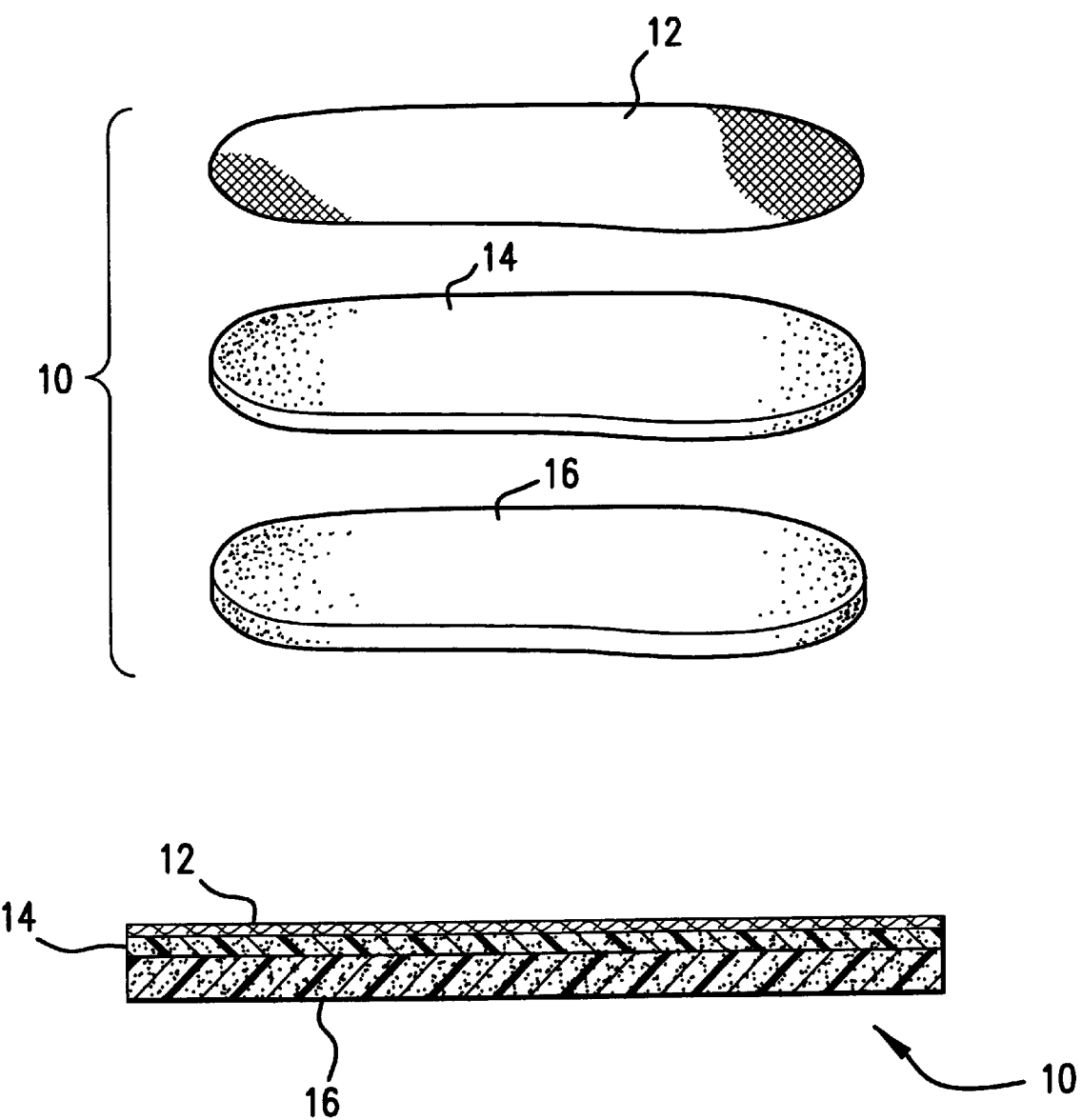
FIG. 2 shows a sample laminate construction of a base susceptor foam with standard foam and fabric top coverings in an exploded isometric view and an assembled cross-section.

An example of an insole laminate construction 10 (FIG. 2) is as follows: a top fabric 12 is bonded to a thin open-cell foam 14, which is bonded to a thicker susceptor-based foam 16. Manufacture of this laminate may be conducted by standard methods (e.g., coextrusion, flame treatment, adhesives, etc.). Conversion of the laminate into a generic footbed involves a rapid inductive-heating-stamping-cooling process. At the consumer level the precut insole 10 can be made to conform to the shape of the foot and the shoe by heating the insole 10 in a microwave oven. The top layer or layers 12, 14 (with one layer being an insulative layer) insulate the foot from the inductively-heated lower susceptor-impregnated foam layer 16.

Figure 3:
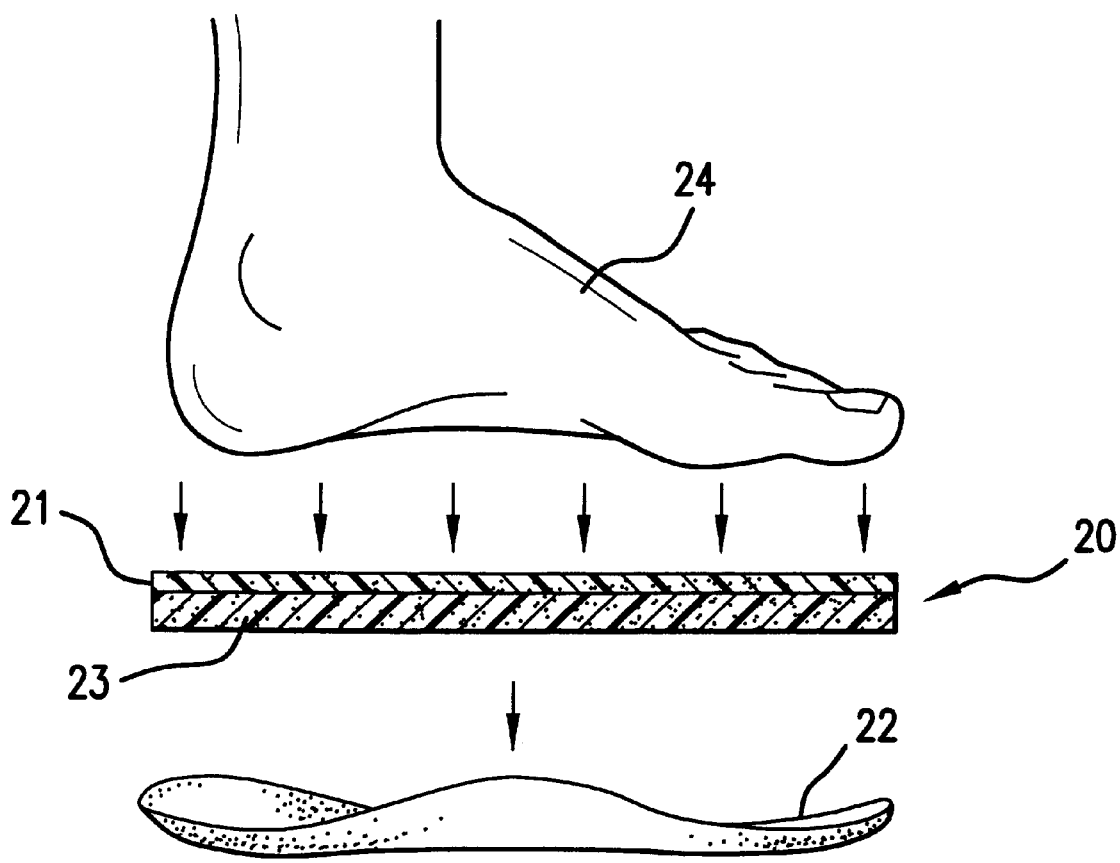
FIG. 3 shows the process of molding a footbed after inductive heating of a thin susceptor foam skin foam to remolding temperatures.

In another iteration (FIG. 3), an insole laminate construction 20 includes a thin susceptor-based upper skin 21 fused or laminated onto a thicker compressible foam 23. Inductive heating of the upper conformable skin 21 is achieved rapidly. Compression of the upper skin 21 by the foot 24 forces the lower compliant foam 23 into a permanent conformed configuration 22. The impression of the foot 24 is retained.

Figure 4:
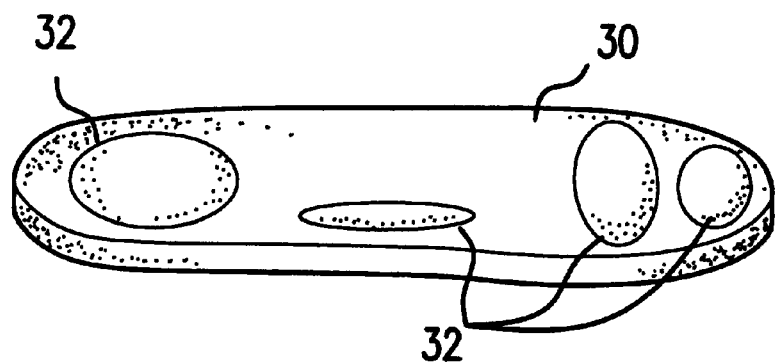
FIG. 4 shows a footbed with variable regions of susceptor based foam.

In another iteration (FIG. 4), only certain regions 32 of the footbed laminate 30 contain the inductively-heated conformable foam. In such a system conformable areas 32 are geometrically constrained. Such a system allows for variation in the density of foam. Areas of the footbed subject to greater pressures have denser conformable foams.

Figure 5:
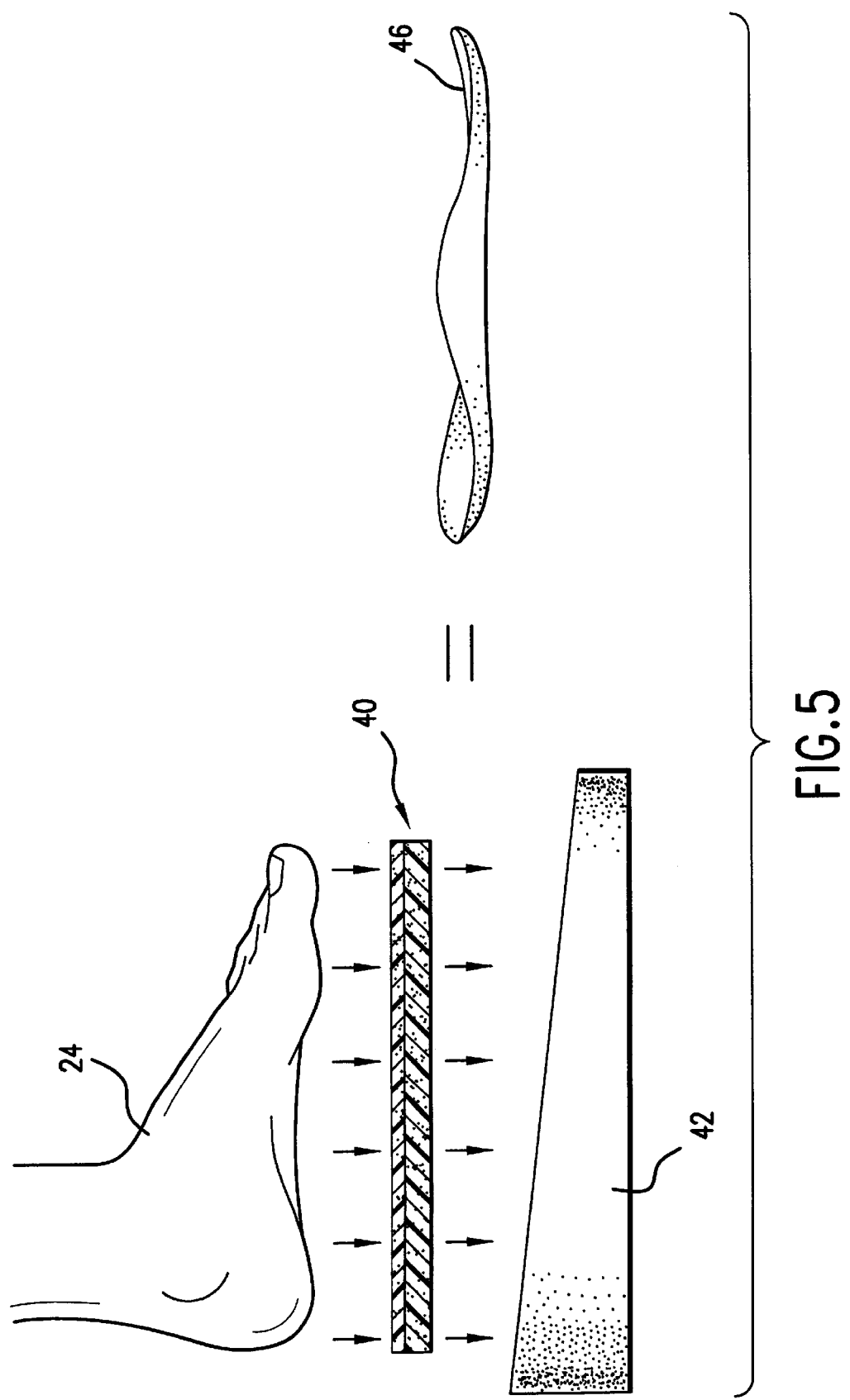
FIG. 5 conceptually depicts a conformable foam manufactured in a shoe or other female cavity, in this case a compressible foam. The foot becomes the male mold during the conformable process.

FIG. 5 depicts the use of a foam wedge 42 to act on a laminate 40 to simulate a heel within the shoe. Such a wedge 42 dramatically improves conformation by forcing the compliant structure 40 against the surface 24 to be molded against, in this case, a human foot 24 is used. The resultant product is conformed configuration 46.

Microwave ovens for consumer use do not distribute energy evenly throughout the susceptible material. This may cause regional overheating, overheating can be minimized or eliminated by removal of susceptor material from the central focus point and replacement with other compressible noninductive materials. Alternatively, modifications of the susceptor-impregnated thermoplastic foam will also achieve greater control of conformable processes. The following parameters can all be varied: type, size and concentration of susceptor; type and concentration of thermoplastic and thermoset polymers and materials; foam cell size, density and geometry, laminate layers or geometric structures.

Figure 6:
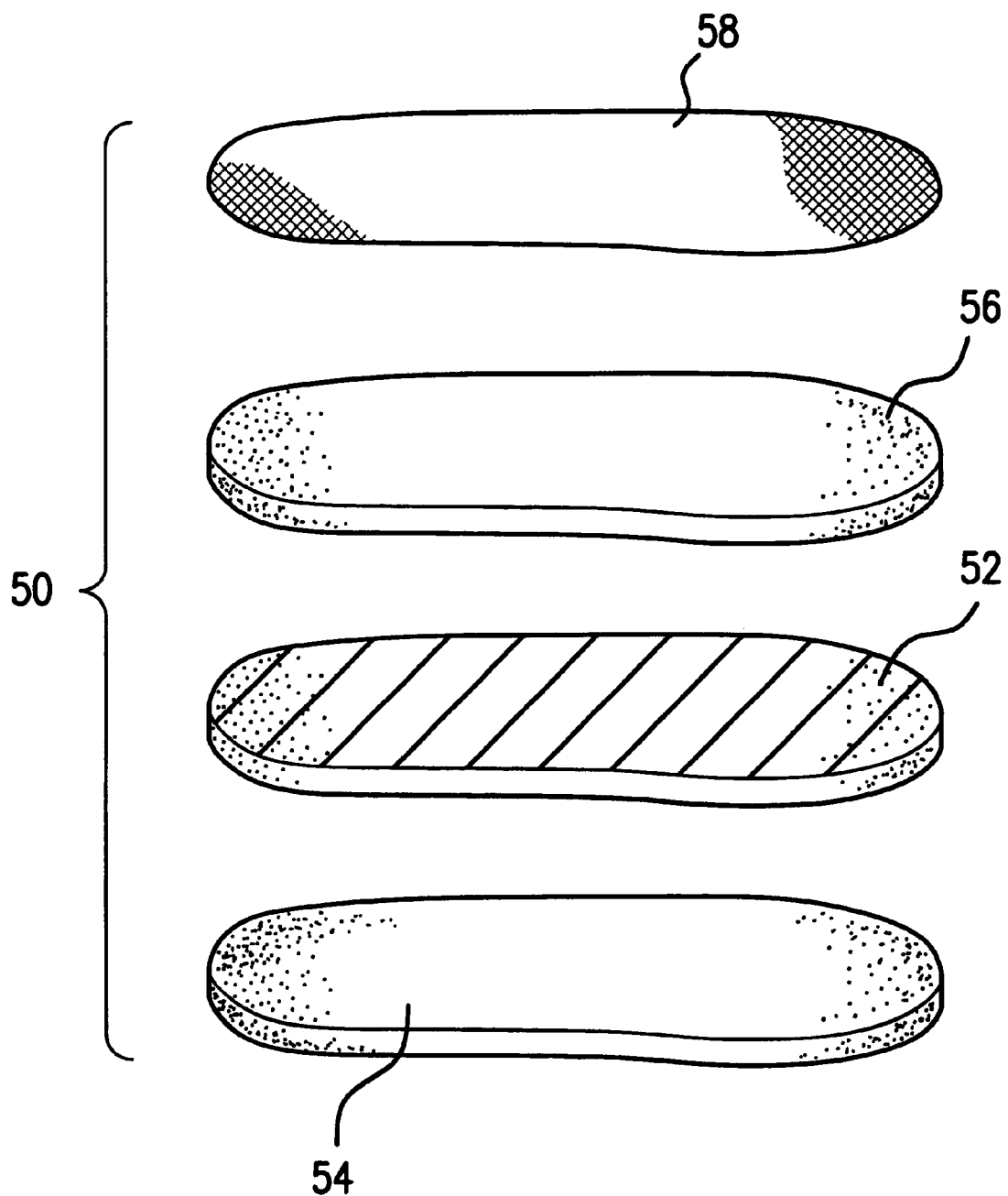
FIG. 6 depicts a conformable foot pad using multiple layers of susceptor based material of different patterns or densities to enhance the conformable nature of the device and to improve its absorption of energy.

In FIG. 6, a foot pad 50 made of layers of susceptor material 52, 54, with different patterns or densities (i) to enhance the conformable nature of the pad and (ii) to better absorb shock. The general principles of multiple layers may also be used in such other applications as are more fully set forth hereafter. An insulation layer 56 and a cover fabric 58 are also provided.

Figure 7:
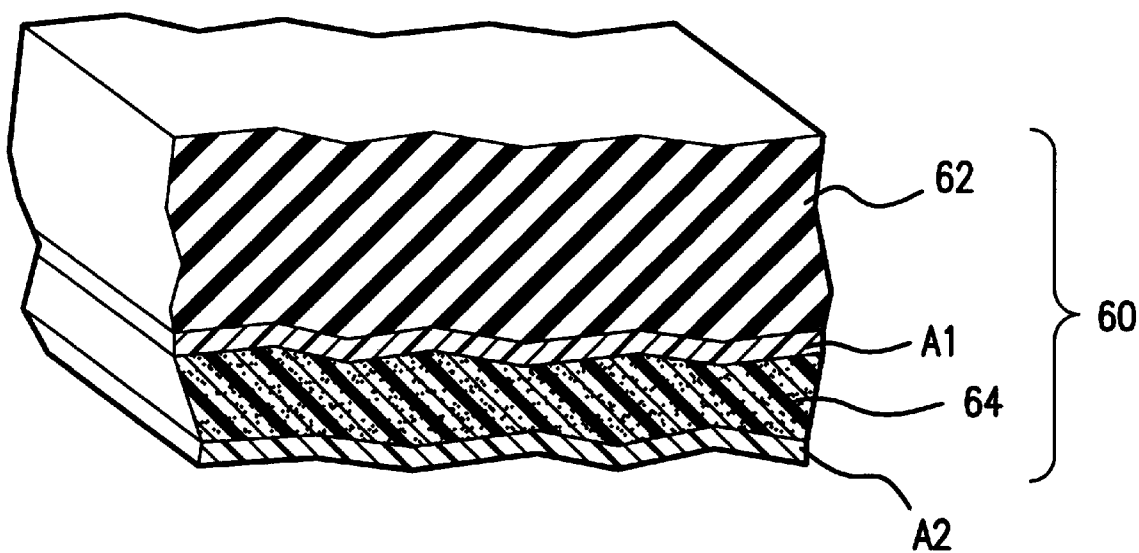
FIG. 7 illustrates the use of polymer beads embedded with susceptor material that can be heated and will conform when enclosed in flexible packaging for use, for instance as a conforming pressure bandage.

FIG. 7 shows a laminate 60 comprising a layer 62 which is granulated and partially-fused polymer. A tape layer 64 is adhered thereto by an adhesive layer Al and has a second adhesive layer A2. Such laminate when placed in a flexible package and exposed to the appropriate energy will fuse together to form a foam-like composite that can be conformed appropriately. Use of such granulated polymer (with susceptor material embedded therein or which is inherently conductive) can create even more highly conforming shapes, depending on the size and shape of such starting material. The appropriate "package" can take many forms including, e.g., a spiral around a bat or tennis racket handle or a hand wrap pseudo-cast, with conformation achieved by a hand impression while the material is malleable.

Figure 8:
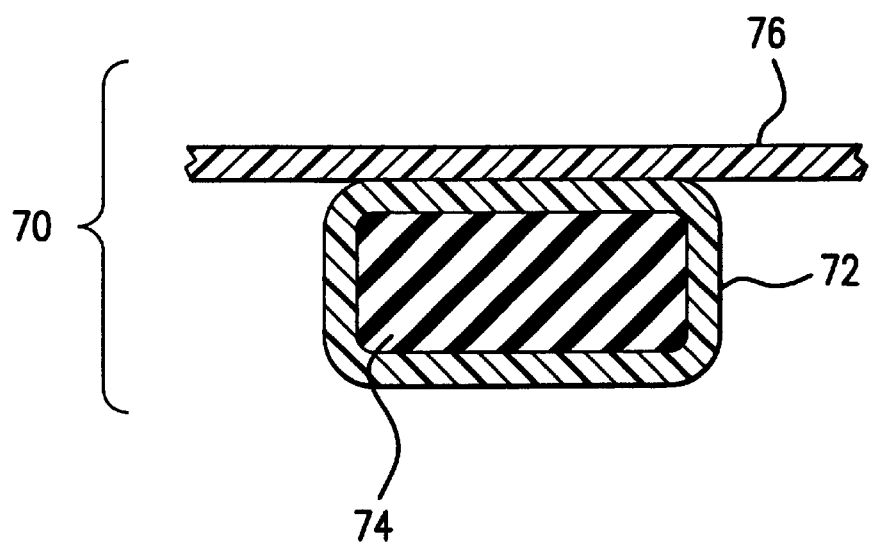
FIG. 8 illustrates a cross-sectional side view of a conformable medical tape or grip tape. Medical tape can be used for a variety of purposes including but not limited to casts and conforming pressure tape for wound healing.

FIG. 8 shows a bandage 70 comprising an enclosure 72, a form 74, therein, and a backing tape 76. After heating, the tape 76 may be applied to a surface in a taught manner so that it first conforms to that surface. The pouch 72, 74 is applied to a wound and pushing on the tape and pouch assembly causes the latter to conform well to the patient and the tape holds the bandage down.

Figure 9:
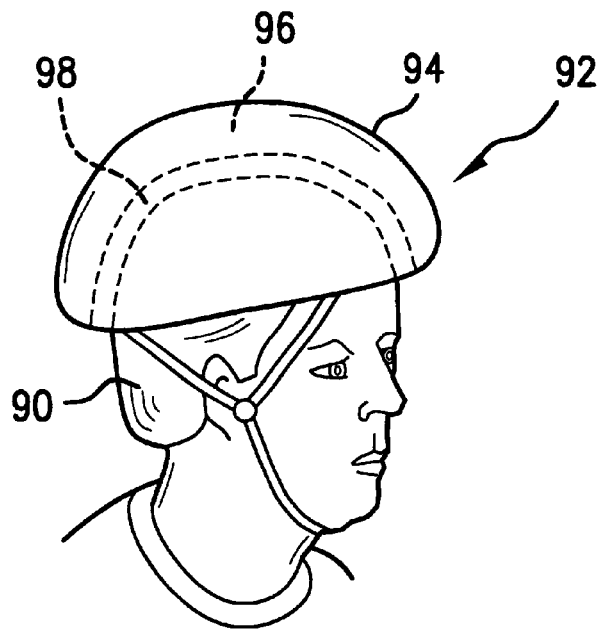
FIG. 9 shows a wearer with a conformable helmet.
Figure 10:
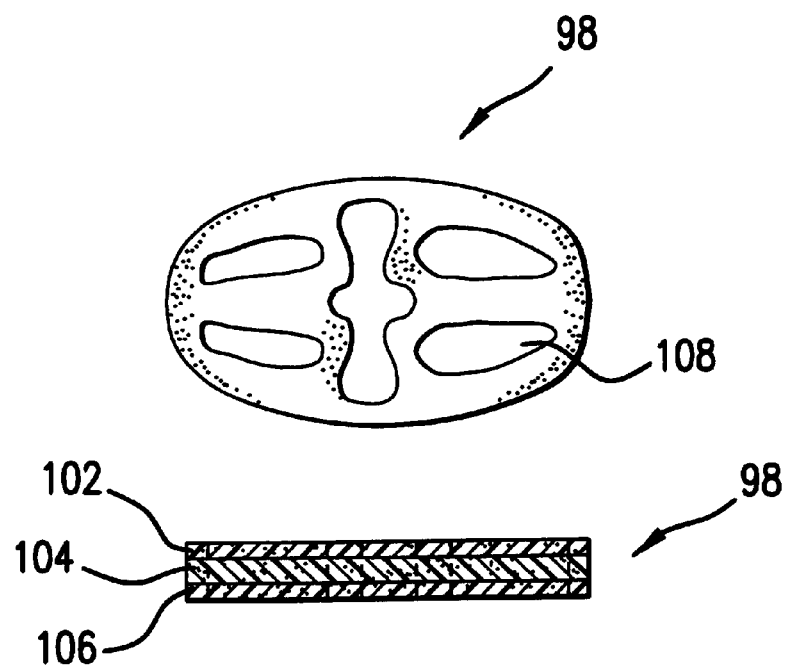
FIG. 10 illustrates orthogonal views of a removable, conforming insert of the helmet.

The conformable molding techniques, described herein, are further adaptable to a broad range of other applications and articles. For example, a conformable helmet which can be used for cycling or in-line skating is illustrated in FIGS. 9 and 10. FIG. 9 illustrates a wearer 90 of the helmet 92 during molding. The helmet 92 includes an outer shell 94, a standard foam shell 96 and a susceptor foam layer 98. In one embodiment, the susceptor foam layer 98 is in the form of a removable insert, illustrated in FIG. 10. The removable insert is elastic such that it can be molded within the standard foam shell and also removed and flattened for heating in a microwave. The top layer 102 of the removable insert is a backing foam. A susceptor-impregnated foam 104, which is microwave-heatable and which will allow the insert to be thermoplastically conformed to a wearer, is bonded to the backing. Below the susceptor-impregnated foam 104 is a soft-padding layer 106 which will contact the wearer's head. Cut-out sections 108 allow for air ventilation through the helmet. The helmet 92 is conformed to the wearer simply by heating the removable insert 98 in a microwave until it becomes thermoplastically deformable, inserting the insert 98 in the helmet 92, and placing the helmet 92 on the wearer 90. The standard foam shell 96 is provided to ensure the existence of a minimum protective layer of foam so as to prevent "bottoming out" of the foam as a result of excessive foam displacement when the thermoplastic layer 104 is conformed to the wearer.

Figure 11:
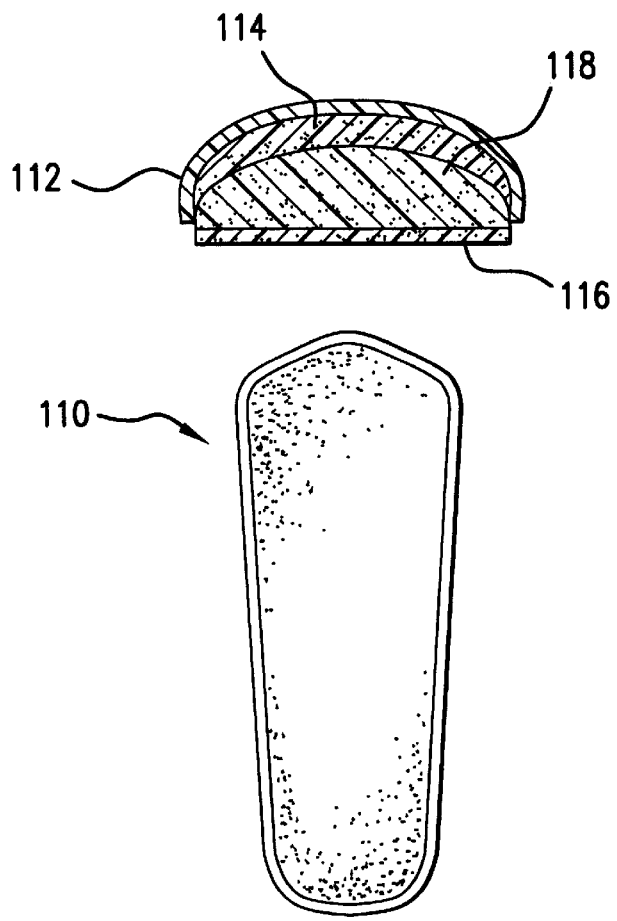
FIG. 11 illustrates orthogonal views of a conformable shin pad.
Figure 12:
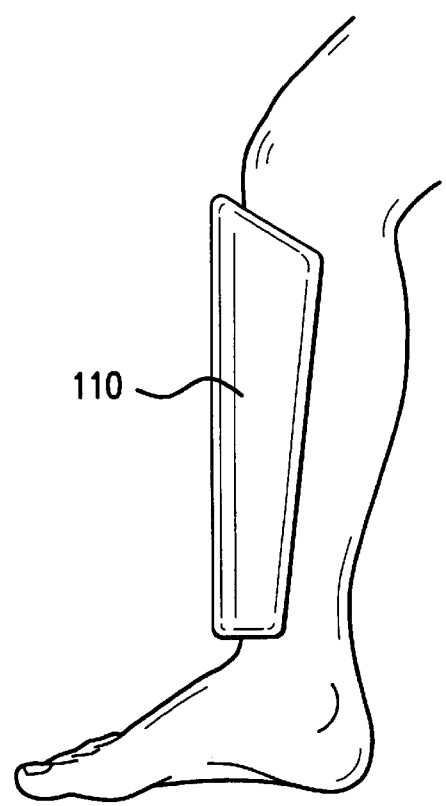
FIG. 12 illustrates a conformable shin pad being conformed to a wearer.

Another application is illustrated in FIGS. 11 and 12. FIG. 11 illustrates a front and top view of a shin guard 110, such as those worn by many soccer players. The shin guard 110 includes a hard shell 112, which is lined with a standard foam layer 114. In this application, susceptor-impregnated foam layer 116 is configured differently from the embodiments thus discussed. The susceptor-based foam 116 is positioned outside a soft-foam layer 118. When the susceptor-based foam layer 116 is softened with heating and pressed against the shin of a wearer, as shown in FIG. 12, the soft-foam layer 118 is elastically deformed. When the susceptor-based foam layer 116 re-solidifies with cooling, it fixes the soft-foam layer 118 in its elastically-deformed state.

Another application for the conformable polymeric padding described herein is in "extreme" body padding or body armor. In this embodiment, the padding is incorporated in form-fitting apparel that is particularly well-suited for rugged extreme sports such as street luge and downhill mountain bike racing. Again, the padding is inductively heated and conformed to the wearer while in a plastically-deformable state.

In addition to the susceptor-based heating methods described above, alternative methods of heating and conforming thermoplastic polymers are also available Alternative embodiments of a conformable article, such as an insole, include (a) a self-heating burst pak design, (b) a burst-conformable design, and (c) an electroform design.

Figure 13:
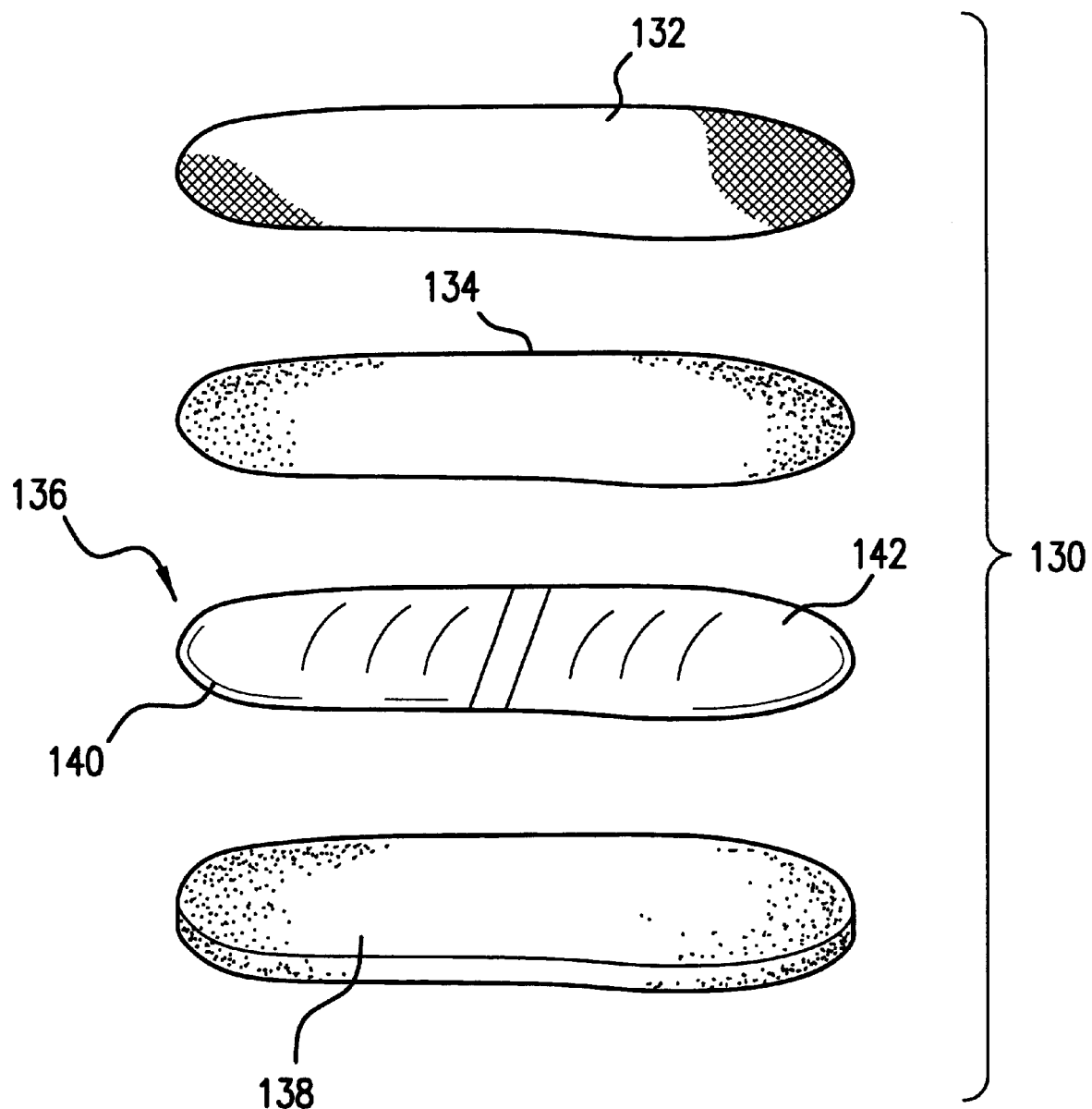
FIG. 13 shows an exploded isometric view of a laminate construction of a self-heating conformable insole.
Figure 14:
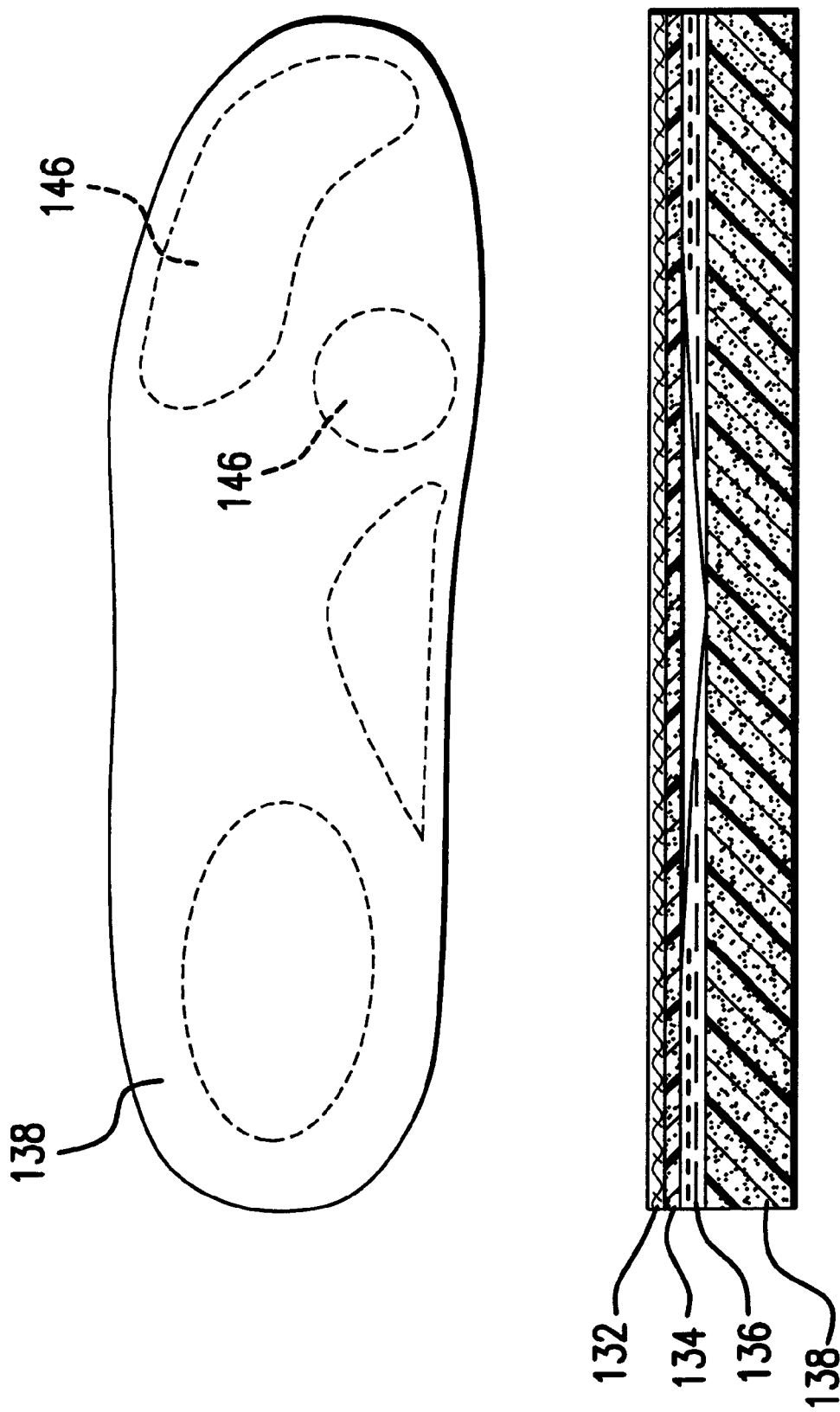
FIG. 14 shows a self-heating conformable insole in a pair of orthogonal views.

A self-heating burst pak design of an insole is illustrated in FIGS. 13 and 14. The burst pak insole 130 includes a laminated configuration of a fabric top liner 132; a thin foam-insulation layer 134 which can include an impregnated paper or antimicrobic; a heat burst pak layer 136; and a heat-conformable premold insole 138, with or without variable-density inserts. Each of these layers is mutually bonded to adjacent layers, and an adhesive is applied to the base of the heat-conformable premold insole to allow the insole 130 to be bonded to a shoe or boot.

The heat burst pak layer 136 is similar to the exothermic hot packs used to treat injuries. The burst pak layer 136 includes a pair of separately packaged reactants. When the packs 140, 142, which contain the reactants are ruptured by force, the reactants are released and an exothermic reaction is triggered. The heat released by this reaction is transferred to the heat-conformable premold insole, thereby softening the insole and allowing it to be thermoplastically molded to adapt to the shape of the pressure-exerting object, e.g., the foot.

Sections of denser foam 146 can be included at high-pressure locations within the heat-conformable premold insole 138. In particular, higher-density foam can be used at locations matching the heel and ball of the foot to prevent the foam from "bottoming out" when it is being thermoplastically molded.

Figure 15:
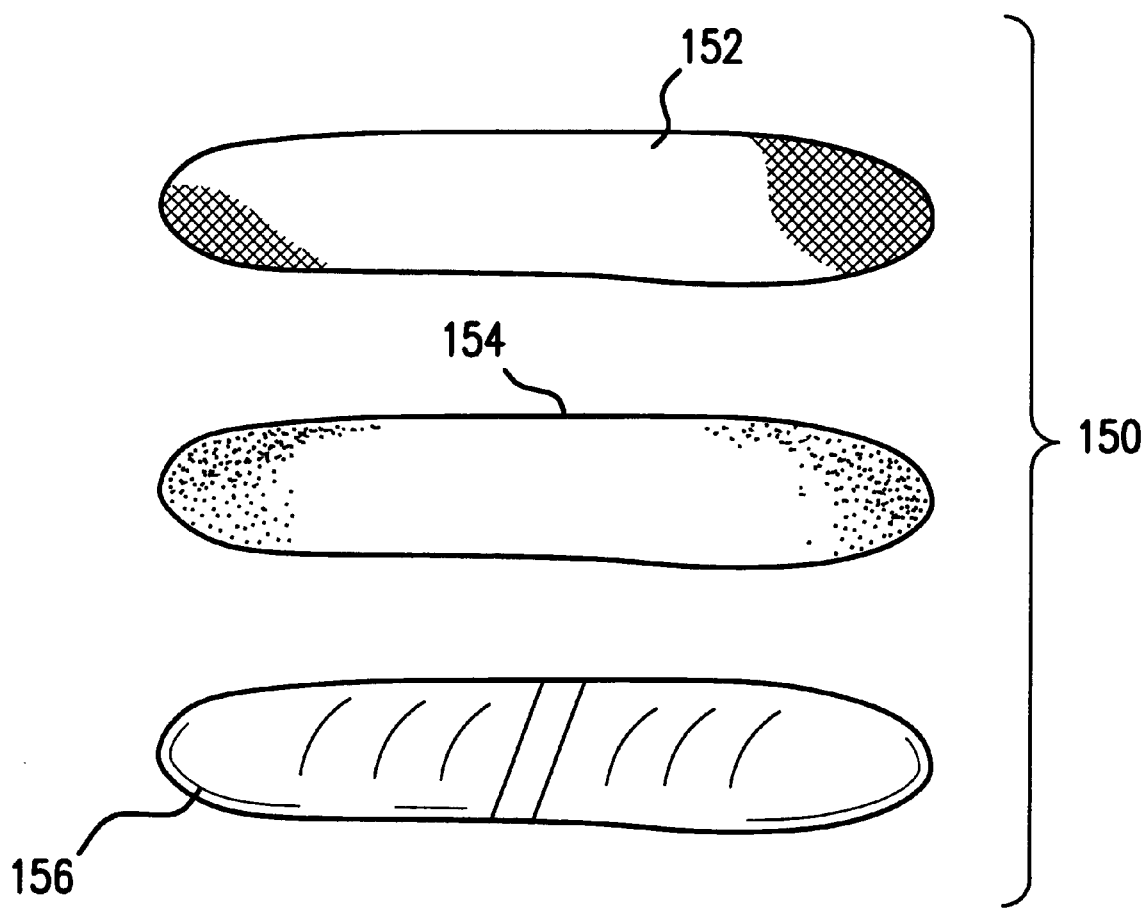
FIG. 15 shows an exploded isometric view of a laminate construction of a burst-conformable insole
Figure 16:
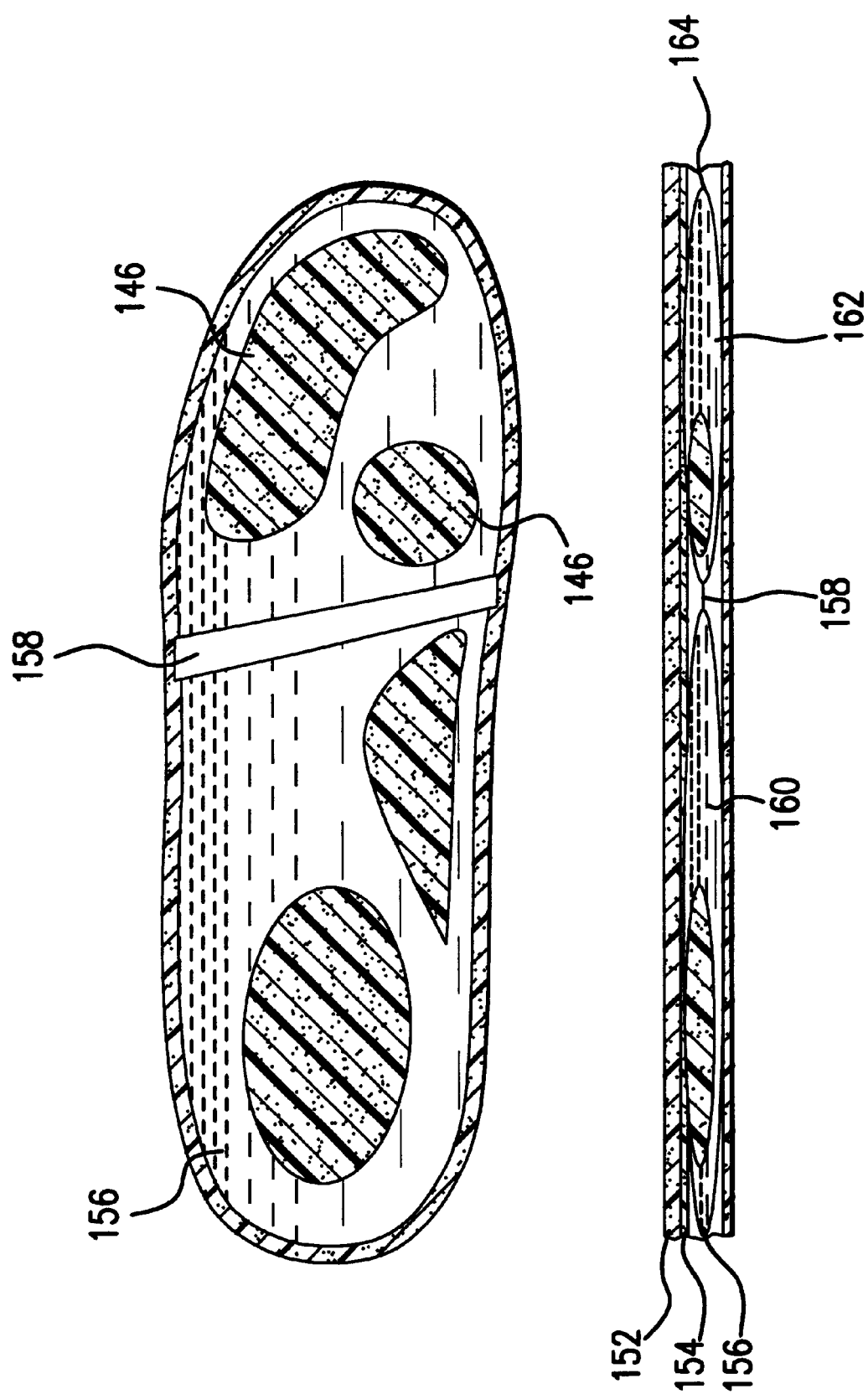
FIG. 16 shows a burst-conformable insole in a pair of orthogonal views.

Another alternative design embodiment is that of the burst-conformable insole, illustrated in FIGS. 15 and 16. This embodiment 150 includes at least three laminated layers. A fabric top liner 152 is placed on top, with a thin foam-insulation layer 154 bonded to the underside of the top liner 152. Finally, a foaming burst pak 156 with variable-density foam inserts 146 and an adhesive undercoat is bonded to the underside of the foam-insulation layer 154.

The foaming burst pak 156 includes separately packaged reactants separated by a frangible seal 158. The frangible seal is preferably formed of Surlyn®, available from DuPont. Surlyn® is a preferred material because it is chemical resistant and will not produce particulates upon rupture. The reactants are contained in separate packs 160, 162 which act as barriers protecting the reactants from oxygen and water to promote the shelf-life of unreacted burst paks. Preferably the barrier layers 164 of the packs comprise a thin metallized layer or a polymer, such as a liquid crystal polymer or polyethylene terephthalate (PET).

In one embodiment, a first pack 160 contains water, while a second pack 162 contains polyurethane prepolymer. When pressure is applied to the foaming burst pak 156, the packs 160, 162 rupture, releasing the water and prepolymer. The water and prepolymer intermix and react in a moisture-curing polymerization reaction. As polymerization proceeds, the resulting foam conforms to the shape of the pressure-exerting object, e.g., the foot.

Inserts of variable-density foam 146 can be included at high-pressure locations within the foaming burst pak. As in the previous embodiment, inserts of higher-density foam 146 can be used at locations matching high-pressure points to prevent the burst pak layer 156 from "bottoming out" when the polymer is foaming.

Figure 17:
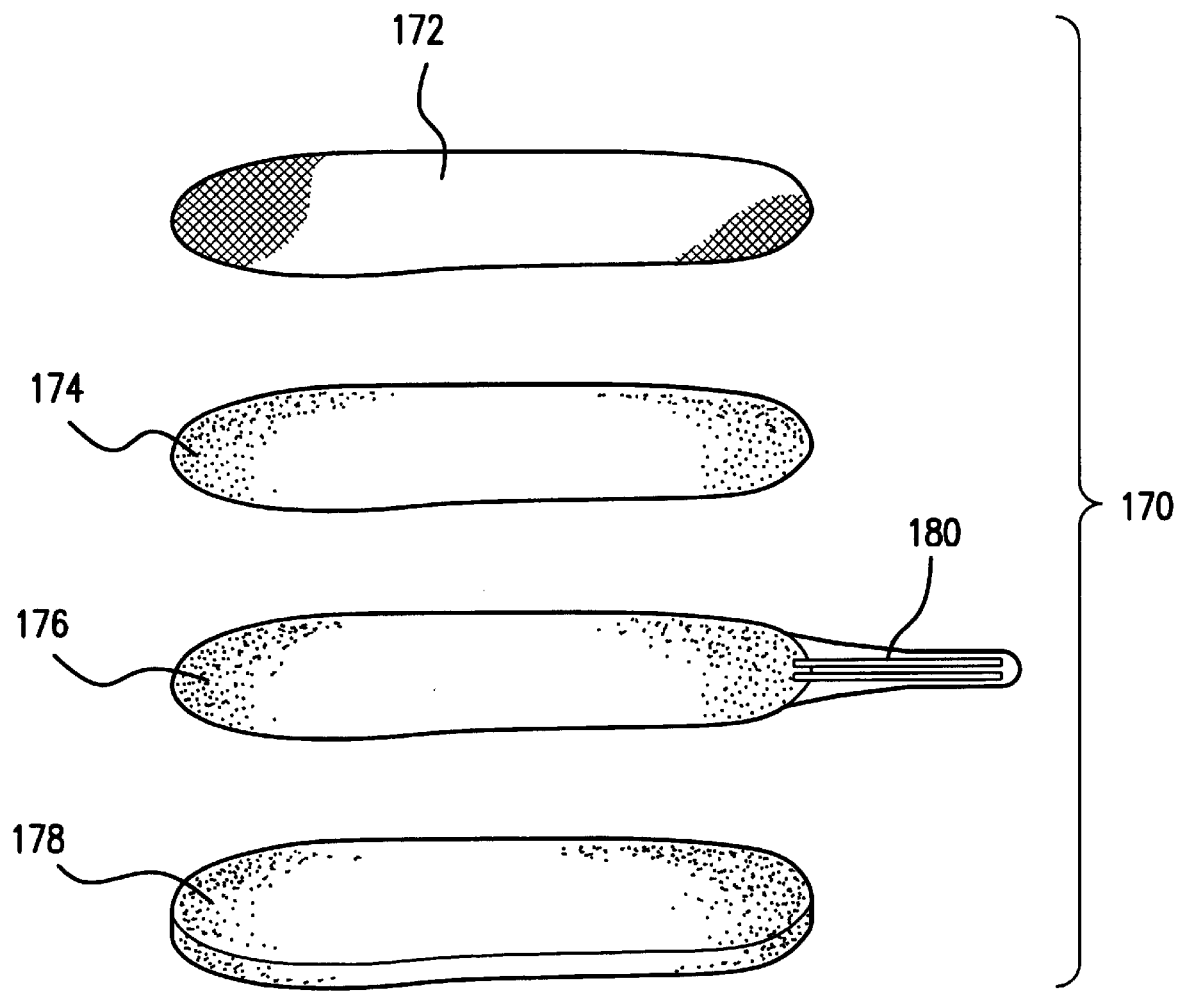
FIG. 17 shows an exploded isometric view of a laminate construction of an electroform insole.
Figure 18:
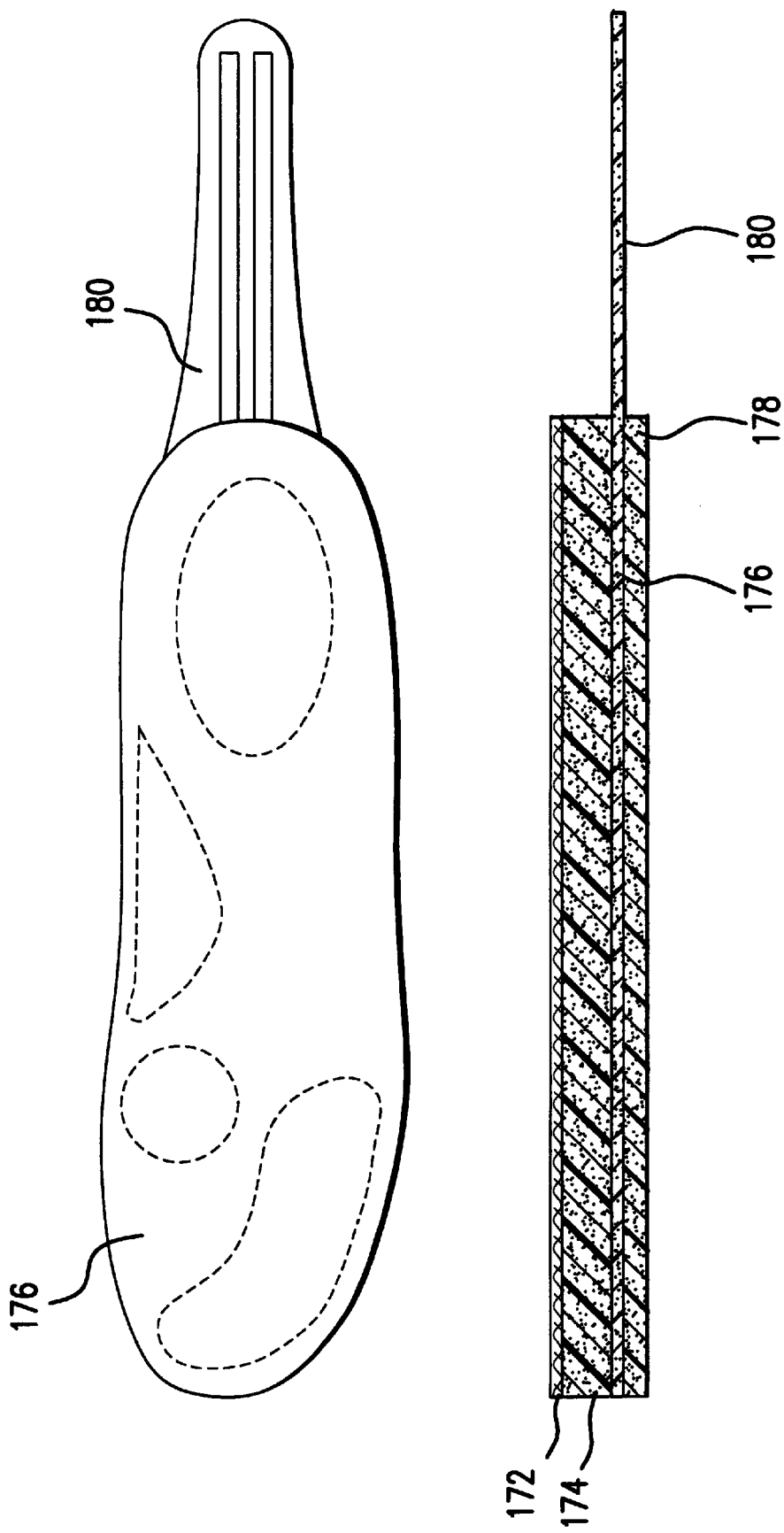
FIG. 18 shows an electroform insole in a pair of orthogonal views.

In yet another embodiment, illustrated in FIGS. 17 and 18, electrically conductive and resistive impregnated materials can be uniformly and rapidly heated by application of electrical voltage. This laminated structure 170 includes a fabric top liner 172 bonded to a thin foam-insulation layer 174. Bonded to the underside of the thin foam-insulation layer 174 is an electrically-conductive resistive circuit on a flexible thermoplastic layer 176. The resistive circuit layer 176 includes a detachable bus bar 180 extending from the heel portion of the insole. Finally, a conformable premold insole 178, with or without the variable-inserts, described above, and an adhesive on its base, is bonded to the underside of the resistive-circuit layer 176. The conformable premold insole 178 can be heated very rapidly and uniformly by simply applying a voltage via the bus bar 176.

While this invention has been particularly shown and described with references to preferred embodiments thereof, it will be understood by those skilled in the art that various changes in form and details may be made therein without departing from the scope of the invention as defined by the appended claims. For example, while many of the procedures have been described in the context of molding specific articles, such as a conformable insole, these same procedures can be easily adapted to molding other conformable products, such as grips, gloves, mouthguards, socks, seats and seat cushions, saddles, elbow and knee guards, shoulder pads, arm and wrist pads, masks, athletic supporter cups, sport bras, ear and nose pads, cap brims, watch bands, and body molds and casts.

We claim:

1. A method for molding an article, comprising the steps of:
   (a) providing a thermo-malleable material;
   (b) impregnating said material with susceptor capable of converting energy into heat;
   (c) heating said material;
   (d) bringing an object into contact with said heated material, thereby allowing said material to substantially conform to the contours of said object; and
   (e) allowing said heated material to cool.

2. The method of claim 1, wherein said material is heated by induction.

3. The method of claim 1, wherein said material is microwave heated.

4. The method of claim 1, wherein said material is heated by a conventional oven.

5. The method of claim 1, wherein said material is electrically insulating.

6. The method of claim 1, wherein said object is a body part.

7. The method of claim 1, wherein said object is a foot.

8. The method of claim 1, wherein said object is a hand.

9. The method of claim 1, wherein said object is a head.

10. The method of claim 1, wherein said object is a lower leg.

11. The method of claim 1, wherein said object is a knee.

12. The method of claim 1 wherein said providing step comprises providing a liquid thermo-malleable polymer.

13. The method of claim 12, wherein said liquid thermo-malleable polymer is liquid ethylene-vinyl acetate.

14. The method of claim 12, wherein said impregnating step further comprises mixing said susceptor with said liquid thermo-malleable polymer.

15. The method of claim 1, wherein said susceptor comprise metals or metal oxides.

16. A method for molding a footbed, comprising the steps of:
   (a) providing a footbed including a thermo-malleable material;
   (b) impregnating said material with susceptor capable of converting energy into heat;
   (c) heating said material;
   (d) bringing a foot into contact with said heated material, thereby allowing said material to substantially conform to the contours of the foot; and
   (e) allowing said heated material to cool.

17. The method of claim 2, wherein said footbed is a foot pad.

18. The method of claim 2, wherein said footbed is an insole.

19. The method of claim 16, wherein said footbed is heated by induction.

20. The method of claim 16, wherein said footbed is microwave heated.

21. The method of claim 16, wherein said footbed is electrically insulating.

22. The method of claim 16, wherein said providing step comprises providing a footbed including a liquid thermo-malleable polymer.

23. The method of claim 22, wherein said liquid thermo-malleable polymer is liquid ethylene-vinyl acetate.

24. The method of claim 22, wherein said impregnating step further comprises mixing said susceptor with said liquid thermo-malleable polymer.

25. The method of claim 16, wherein said susceptors comprise metals or metal oxides.

26. The method of claim 16, wherein said susceptor are tin oxides.

* * * * *

UNITED STATES PATENT AND TRADEMARK OFFICE
CERTIFICATE OF CORRECTION

PATENT NO.    : 6,346,210 B1
DATED         : February 12, 2000
INVENTOR(S)   : Swartz et al.

It is certified that error appears in the above-identified patent and that said Letters Patent is hereby corrected as shown below:

Column 9-10,
In claims 1, 14-16, 24 and 26, delete the word "susceptor" and insert therefor
-- suspectors --.
In claims 15 and 25, delete the phrase "comprise metals or metal oxides" and insert therefor -- are chosen from the group comprising metals and metal oxides --.

Signed and Sealed this

Seventh Day of January, 2003

JAMES E. ROGAN
*Director of the United States Patent and Trademark Office*